Patented Feb. 28, 1950

2,499,172

UNITED STATES PATENT OFFICE 2,499,172

PROCESS FOR CONVERTING LOWER-BOILING KETONES INTO HIGHER-BOILING KETONES

Everet Foy Smith, Terre Haute, Ind., assignor to Commercial Solvents Corporation, Terre Haute, Ind., a corporation of Maryland No Drawing. Application February 9, 1946, Serial No. 646,720

14 Claims. (Cl. 260—593)

This invention relates to a process for converting lower-boiling ketones into higher-boiling ketones by treatment with hydrogen in the presence of an alkaline condensation catalyst and a palladium hydrogenation catalyst. More particularly, it relates to a single-step method for condensing, dehydrating, and hydrogenating lower-boiling aliphatic ketones in the presence of an alkaline condensation catalyst and a palladium hydrogenation catalyst to produce higher-boiling ketones. In one specific embodiment, the invention comprises reacting acetone with hydrogen in the presence of aqueous potassium hydroxide and 5% palladium on charcoal under a pressure above 250 pounds per square inch and at a temperature in the range of about 90 to 250° C. to produce isobutyl methyl ketone and minor quantities of other higher-boiling ketones.

The condensation of ketones such as acetone to give hydroxy ketones such as diacetone alcohol is a well-known reaction. The subsequent dehydration of the hydroxy ketones to give unsaturated ketones, such as mesityl oxide, is also well-known, and selective hydrogenation of the resulting olefinic bond may be carried out by a number of methods, disclosed in the literature, to give the corresponding saturated higher ketones, such as isobutyl methyl ketone.

I have now discovered that the foregoing series of reactions may be carried out in one operation by subjecting the original ketone to the action of hydrogen at elevated temperatures and pressures in the presence of an alkaline condensation catalyst and a hydrogenation catalyst comprising palladium. It will be obvious to those skilled in the art that my process offers many advantages over the processes now in use, since in a single-step process the handling of materials is reduced to a minimum, heat economy is facilitated, the isolation of the intermediate compounds is avoided, and the processing time is greatly shortened. Moreover, my process is capable of producing substantially greater over-all yields, based on the original ketone, than in the prior art.

The ketones employed as the charging stock in my process are chosen from the group consisting of the lower-boiling aliphatic ketones, and best results are obtained with ketones having not more than six carbon atoms in the molecule. As examples of such ketones may be cited acetone, ethyl methyl ketone, diethyl ketone, isopropyl methyl ketone, butyl methyl ketone, and isobutyl methyl ketone. Complex products are formed when two or more ketones are processed simultaneously; and by a suitable choice of starting materials, products having a wide range of properties may be obtained.

The condensation catalyst may be chosen from a large field of alkaline compounds comprising the following types and examples: ammonia; amines, such as isopropylamine, diisopropylamine, trimethylamine, furfurylamine, difurfurylamine, and aniline; alkali-metal hydroxides; alkaline-earth-metal oxides and hydroxides; and alkali-metal salts of weak acids, such as sodium borate, carbonate, acetate, and phosphates. These condensation catalysts vary considerably in effectiveness. I have found potassium hydroxide to be one of the best, particularly when used in the form of a dilute aqueous solution.

In carrying out my process, I have unexpectedly found it advantageous to add water to the mixture of ketone and condensation catalyst, despite the fact that the presence of water would normally be expected to oppose the dehydration of the hydroxy ketone, which is thought to be an essential step in my process. The presence of the water is believed to help in producing a more even dissemination of the condensation catalyst throughout the reactant mixture, and to help in preventing over-condensation of a part of the ketone through excessive contact with the condensation catalyst.

To my reactant mixture I may also add an organic solvent of a type that tends to promote admixture of the ketone with water and the condensation catalyst, and which should be of a type that is not permanently changed during the process. As examples of such solvents may be cited the lower-boiling aliphatic alcohols, such as methanol, ethanol, n-propyl alcohol, and isopropyl alcohol. By the use of various solvents, I have found it possible substantially to alter the ratio of ketones in the reaction product. In the processing of acetone, for example, a substantially greater conversion to 2,6-dimethyl-4-heptanone is produced by adding methanol to the reactant mixture.

My process is operative over a wide range of proportions of the condensation catalyst. For example, I have successfully used as little as 0.25% of sodium hydroxide, based on the weight of ketone, and I have obtained excellent results by using aqueous 5% potassium hydroxide solution in a volume equal to the volume of the ketone.

The hydrogenation catalyst may consist of pure palladium metal or of palladium oxide, but is preferably prepared in a form comprising palladium on charcoal or other inert carrier by impregnating the carrier with a palladium salt and subsequently reducing prior to use. Other types of hydrogenation catalysts, such as platinum, copper chromite, and Raney nickel, have been found to be inoperative in my process, possibly because they may tend to inhibit the initial condensation and dehydration, or because they may tend to favor the hydrogenation of the ketone to the corresponding alcohol.

Hydrogen of a relatively high degree of purity is preferred for use in my process. It need not be absolutely pure, but reactive impurities such as oxygen should be kept as low as possible, and such materials as carbon monoxide, sulfur, and hydrogen sulfide should be excluded altogether, since they tend to cause rapid and serious poisoning of palladium catalysts. Inert impurities such as nitrogen are undesirable because they increase the total pressure in the reaction vessel necessary to maintain the required partial pressure of hydrogen. For this reason, the proportion of inert impurities should be kept as low as possible.

The partial pressure of hydrogen required in my process may range from 250 pounds per square inch upward, but is preferably within the range of 500 to 2000 pounds per square inch.

Temperatures from about 90 to 250° C. may be used. The preferred temperature varies somewhat, depending on the type of ketone being processed, the type and concentration of condensation catalyst, and the activity of the palladium catalyst, but will ordinarily be found to lie within the range of 135 to 200° C.

My process may be carried out by introducing a mixture of the reactants, solvents, and catalysts into a conventional autoclave equipped with a suitable stirrer and a jacket or coil for maintaining the charge at the proper temperature. Hydrogen is then injected to the desired pressure, and the autoclave is heated to the desired reaction temperature. During the reaction, hydrogen is added either intermittently or continuously as required to maintain the pressure at the desired level. When the hydrogenation has been completed, as evidenced by the cessation of hydrogen absorption, the reaction mixture is cooled, the autoclave is vented, the contents are discharged, and the product is isolated in a known manner.

Alternatively, I may carry out my process by passing a slurry of the powdered catalysts in the liquid reactant mixture through a column in contact with hydrogen gas under proper conditions of temperature and pressure. Or I may pass the reactant mixture through a stationary bed of pelleted or supported catalysts, enclosed in a reaction vessel of suitable design.

The following examples are given to illustrate my invention, and are not to be construed as limiting it to the exact reactants or conditions described:

Example 1

A mixture of 408 g. acetone, 40 g. liquid ammonia, and 5 g. 5% palladium on charcoal was introduced into a stainless-steel rocking bomb having a total volume of 1840 ml., and the bomb was sealed and transferred to a rocking unit oscillating at the rate of 37 cycles per minute. Hydrogen was then injected to a pressure of 1000 pounds per square inch, gage, and the bomb was rocked and heated to a temperature of 150° C. The pressure reached a maximum of 1375 pounds per square inch prior to the initiation of the hydrogenation; and as the hydrogenation proceeded, fresh hydrogen was introduced from time to time to restore the pressure to its initial level of 1000 pounds per square inch. A total pressure drop slightly more than 935 pounds per square inch took place in 2.5 hours, at the end of which time the hydrogenation was complete. The bomb was then cooled and emptied, and the product was filtered to remove the catalyst and subsequently fractionally distilled through a laboratory column packed with single-turn glass helices. The following materials were separated: 15 g. isopropylamine, 102 g. acetone, and 111 g. isobutyl methyl ketone. From these data, it was calculated that the isobutyl methyl ketone had been produced in 31.5% conversion and 42.0% yield, based on the acetone.

Example 2

A mixture of 272 g. acetone and 138 g. isopropylamine was hydrogenated over 1 g. 5% palladium on charcoal at 175° C. and 500 pounds per square inch as described in Example 1. The pressure rose to a maximum of 710 pounds per square inch, and a total pressure drop of 230 pounds per square inch took place during 1.3 hours. From the product were separated 45 g. isopropylamine, 149 g. acetone, 141 g. diisopropylamine, and 36.8 g. isobutyl methyl ketone.

Example 3

Acetone (396 g.) was hydrogenated in the presence of 5 g. barium hydroxide $(Ba(OH)_2.8H_2O)$ and 2 g. 5% palladium on charcoal at 175° C. and 500 pounds per square inch as described in Example 1. The pressure rose to a maximum of 700 pounds per square inch, and a total pressure drop of 395 pounds per square inch took place during 2.75 hours. From the product were separated 240 g. acetone, 32 g. isopropyl alcohol, and 56 g. isobutyl methyl ketone, corresponding to a 16.5% conversion and a 42% yield, based on acetone.

Example 4

A mixture of 317 g. acetone and 200 ml. water was hydrogenated in the presence of 2.6 g. borax (sodium tetraborate) and 2.6 g. 5% palladium on charcoal at 235° C. and 1000 pounds per square inch as described in Example 1. The pressure rose to a maximum of 1575 pounds per square inch, and a total pressure drop of 800 pounds per square inch took place in 1.5 hours. From the product were separated 70.5 g. acetone, 44 g. isopropyl alcohol, and 87 g. isobutyl methyl ketone, corresponding to a 32% conversion and a 41% yield, based on acetone.

Example 5

A mixture of 396 g. acetone and 25 ml. water was hydrogenated in the presence of 5 g. potassium carbonate and 2 g. 5% palladium on charcoal at 175° C. and 500 pounds per square inch as described in Example 1. The pressure rose to a maximum of 925 pounds per square inch, and a total pressure drop of 110 pounds per square inch took place in 2.5 hours. From the product were separated 325 g. acetone, 20 g. isopropyl alcohol, and 9 g. isobutyl methyl ketone.

Example 6

Acetone (396 g.) was hydrogenated in the presence of 1 g. sodium hydroxide and 2 g. 5% palladium on charcoal at 150° C. and 500 pounds per square inch as described in Example 1. The pressure rose to a maximum of 710 pounds per square inch, and a total pressure drop of 740 pounds per square inch took place in 2.25 hours. From the product were separated 128.1 g. acetone, 48 g. isopropyl alcohol, and 71 g. isobutyl methyl ketone, corresponding to a 21% conversion and a 31% yield, based on acetone.

*Example 7*

Acetone (396 g.) was hydrogenated in the presence of 25 g. potassium hydroxide and 2 g. 5% palladium on charcoal at 175° C. and 1000 pounds per square inch as described in Example 1. The pressure rose to a maximum of 1225 pounds per square inch, and a total pressure drop of 695 pounds per square inch took place in 2.0 hours. From the product were separated 57.7 g. acetone, 33 g. isopropyl alcohol, and 123.5 g. isobutyl methyl ketone, corresponding to a 36% conversion and a 42% yield, based on acetone.

*Example 8*

A mixture of 396 g. acetone and 25 ml. water was hydrogenated in the presence of 25 g. potassium hydroxide and 2 g. 5% palladium on charcoal at 150° C. and 1000 pounds per square inch as described in Example 1. The pressure rose to a maximum of 1275 pounds per square inch, and a total pressure drop of 575 pounds per square inch took place in 2.75 hours. From the product were separated 119.4 g. acetone, 31.8 g. isopropyl alcohol, and 137.3 g. isobutyl methyl ketone, corresponding to a 40% conversion and a 58% yield, based on acetone.

*Example 9*

A mixture of 396 g. acetone and 525 g. aqueous 5% potassium hydroxide solution was hydrogenated over 2 g. 5% palladium on charcoal at 150° C. and 1000 pounds per square inch as described in Example 1. The pressure rose to a maximum of 1250 pounds per square inch, and a total pressure drop of 1670 pounds per square inch took place during 4.5 hours. From the product were separated 21.4 g. acetone, 10 g. isopropyl alcohol, and 223 g. isobutyl methyl ketone, corresponding to a 65% conversion and a 69% yield, based on acetone.

*Example 10*

A mixture of 396 g. acetone and a solution of 25 g. potassium hydroxide in 500 ml. methanol was hydrogenated over 2 g. 5% palladium on charcoal at 130° C. and 1000 pounds per square inch as described in Example 1. The pressure reached a maximum of 1110 pounds per square inch, and a total pressure drop of 1865 pounds per square inch took plate in 4.7 hours. From the product were separated 33 g. acetone, 29 g. isopropyl alcohol, 121 g. isobutyl methyl ketone, and 62 g. higher-boiling ketones.

*Example 11*

Ethyl methyl ketone (322 g.) was hydrogenated in the presence of 20 g. potassium hydroxide and 2 g. 5% palladium on charcoal at 150° C. and 1000 pounds per square inch as described in Example 1. The pressure reached a maximum of 1400 pounds per square inch, and a total pressure drop of 200 pounds per square inch took place in 2.5 hours. On distillation, the product was found to comprise 147 g. ethyl methyl ketone, 22 g. 2-butanol, and a mixture of the higher-boiling ketones theoretically derivable from ethyl methyl ketone.

I claim as my invention:

1. A process for producing ketones from lower-boiling saturated aliphatic ketones which comprises heating the lower-boiling saturated aliphatic ketones with hydrogen in the presence of an alkaline condensation catalyst and a hydrogenation catalyst consisting of palladium.

2. A process for producing higher-boiling ketones which comprises heating with hydrogen a lower-boiling saturated aliphatic ketone having not more than six carbon atoms per molecule in the presence of an alkaline condensation catalyst and a hydrogenation catalyst consisting of palladium.

3. The process of claim 2 in which the reaction is carried out in the presence of water.

4. The process of claim 2 in which the reaction is carried out in the presence of a lower-boiling aliphatic alcohol.

5. The process of claim 2 in which the reaction is carried out in the presence of water and a lower-boiling aliphatic alcohol.

6. A process for producing higher-boiling ketones which comprises heating with hydrogen a lower-boiling saturated aliphatic ketone having not more than six carbon atoms per molecule at a temperature in the range of about 90 to 250° C. and at a pressure above about 250 pounds per square inch in the presence of an alkaline condensation catalyst and a hydrogenation catalyst consisting of palladium.

7. The process of claim 6 in which the lower-boiling saturated aliphatic ketone is acetone.

8. A process for producing isobutyl methyl ketone which comprises heating acetone with hydrogen at a temperature in the range of about 135 to 200° C. and at a pressure above about 250 pounds per square inch in the presence of an alkaline condensation catalyst and a hydrogenation catalyst consisting of palladium on charcoal.

9. A process for producing isobutyl methyl ketone which comprises heating acetone with hydrogen at a temperature in the range of about 135 to 200° C. and at a pressure above about 250 pounds per square inch in the presence of a hydrogenation catalyst consisting of palladium on charcoal, an alkaline condensation catalyst, and water.

10. A process for producing isobutyl methyl ketone which comprises heating acetone with hydrogen at a temperature in the range of about 135 to 200° C. and at a pressure above about 250 pounds per square inch in the presence of a hydrogenation catalyst consisting of palladium on charcoal, an alkaline condensation catalyst, and an aliphatic alcohol containing not in excess of three carbon atoms.

11. A process for producing isobutyl methyl ketone which comprises heating acetone with hydrogen at a temperature in the range of about 135 to 200° C. and at a pressure above about 250 pounds per square inch in the presence of a hydrogenation catalyst consisting of palladium on charcoal, an alkaline condensation catalyst, water, and an aliphatic alcohol containing not in excess of three carbon atoms.

12. The process of claim 11 in which the alkaline condensation catalyst is sodium tetraborate.

13. The process of claim 11 in which the alkaline condensation catalyst is sodium hydroxide.

14. The process of claim 11 in which the alkaline condensation catalyst is potassium hydroxide.

EVERET FOY SMITH.

(References on following page)

REFERENCES CITED

The following references are of record in the file of this patent:

UNITED STATES PATENTS

| Number | Name | Date |
|---|---|---|
| 2,158,040 | Blumenfeld | May 9, 1939 |

OTHER REFERENCES

Delepine Comptes rendus, 201, 1301–5 (1935).

Lassieur Compt. rend., vol. 156, page 795 (1913).

Ipatieff "Catalytic Reactions at High Pressures and Temperatures," Copyright 1936 by the MacMillan Co., New York, page 291.

Bourdiol Bull Soc. Chim, vol. 8, pages 375–381 (1941).

Surmin J. Gen. Chem. (U. S. S. R.), vol. 5, pages 1639–41 (1935). Abstracted in Chemical Abstracts, vol. 30, 3404, (1936).